United States Patent
Hong et al.

(10) Patent No.: US 9,356,522 B2
(45) Date of Patent: May 31, 2016

(54) POWER SUPPLY CIRCUIT FOR DRIVING LED LAMP AND POWER SUPPLY METHOD, AND PRIMARY-SIDE CONTROL CIRCUIT OF FLYBACK TRANSFORMER

(71) Applicant: SILICON WORKS CO., LTD., Daejeon-si (KR)

(72) Inventors: Ju Pyo Hong, Daejeon (KR); Jun Ho Kim, Daejeon (KR)

(73) Assignee: SILICON WORKS CO., LTD., Daejeon-Si (KR)

( * ) Notice: Subject to any disclaimer, the term of this patent is extended or adjusted under 35 U.S.C. 154(b) by 0 days.

(21) Appl. No.: 14/403,782

(22) PCT Filed: May 31, 2013

(86) PCT No.: PCT/KR2013/004862
§ 371 (c)(1),
(2) Date: Nov. 25, 2014

(87) PCT Pub. No.: WO2013/180547
PCT Pub. Date: Dec. 5, 2013

(65) Prior Publication Data
US 2015/0137694 A1 May 21, 2015

(30) Foreign Application Priority Data

May 31, 2012 (KR) .................. 10-2012-0058542

(51) Int. Cl.
*H05B 33/08* (2006.01)
*H02M 3/335* (2006.01)
*H02M 1/42* (2007.01)
*H02M 1/14* (2006.01)

(52) U.S. Cl.
CPC ............ *H02M 3/33507* (2013.01); *H02M 1/14* (2013.01); *H02M 1/42* (2013.01); *H02M 1/4258* (2013.01); *H05B 33/0815* (2013.01); *H05B 33/0818* (2013.01); *Y02B 70/126* (2013.01)

(58) Field of Classification Search
USPC ......... 315/205, 206, 224, 247, 291, 307, 308; 363/20, 21.12, 37, 46, 81, 89, 126
See application file for complete search history.

(56) References Cited

U.S. PATENT DOCUMENTS 5,600,546 A * 2/1997 Ho et al. ................... 363/21.18
5,757,626 A * 5/1998 Jovanovic et al. ......... 363/21.04
(Continued)

FOREIGN PATENT DOCUMENTS

CN 1205807 1/1999
CN 201608948 10/2010
(Continued)

OTHER PUBLICATIONS

International Search Report for International Application No. PCT/KR2013/004862, dated Nov. 22, 2013.
(Continued)

*Primary Examiner* — Thai Pham
(74) *Attorney, Agent, or Firm* — Kile Park Reed & Houtteman PLLC

(57) ABSTRACT

The present invention discloses a power supply circuit for driving an LED lamp and a power supply method. The power supply circuit is constituted by an AC-DC converter by adopting DCM-DCM. Also, the power supply circuit adopts a valley fill circuit to reduce rippling of output current and adopts the DCM-DCM to stabilize a link voltage, thereby realizing a power factor correction circuit having two-stage structures. Thus, an input voltage of the flyback converter may be improved, and a high reverse voltage may be applied.

20 Claims, 14 Drawing Sheets

(56) References Cited

U.S. PATENT DOCUMENTS 6,108,222 A * 8/2000 Liang ............................ 363/48
6,909,622 B2 * 6/2005 Weng ........................... 363/126
8,754,625 B2 * 6/2014 Walters ........................ 323/285

FOREIGN PATENT DOCUMENTS

| CN | 202127526 | 1/2012 |
|---|---|---|
| KR | 10-2009-0124215 | 12/2009 |
| KR | 20-2011-0005831 | 6/2011 |
| KR | 10-2012-0034038 | 4/2012 |
| WO | 03/001855 | 1/2003 |

OTHER PUBLICATIONS

Jun-Ho Kim et al., "Reduction of Voltage and Current stress of DCM-DCM single-phase Power Factor Correction AC/DC converter with Wide input Voltage Ranges using Voltage Doubler" KIPE 2010 Annual Summer Conference, 2010, pp. 349-350.

* cited by examiner

POWER SUPPLY CIRCUIT FOR DRIVING LED LAMP AND POWER SUPPLY METHOD, AND PRIMARY-SIDE CONTROL CIRCUIT OF FLYBACK TRANSFORMER

TECHNICAL FIELD

The present disclosure relates to a power circuit, and more particularly, to a power circuit for driving an LED lamp, a method for supplying power to the LED lamp by using a valley fill circuit, and a primary side control circuit of a flyback transformer that performs DC-DC converting.

BACKGROUND ART

Recently, in order to improve resource exhaustion and environmental issues, various methods for increasing the efficiency of an electric apparatus have been spotlighted.

In an illumination field, an existing illumination apparatus using a fluorescent lamp or a mercury lamp has been replaced with an LED lamp due to energy inefficiency. The LED lamp is required to have a high power factor in order to increase the energy efficiency.

A conventional AC-DC converter for driving an LED lamp may have a two-stage structure employing a boost converter and a flyback converter in order to obtain a high power factor. The boost converter is provided for power factor correction and the flyback converter is provided for DC-DC converting.

The AC-DC converter having the aforementioned two-stage structure requires an active element and a control loop according to steps. That is, the aforementioned AC-DC converter is required to use a large number of circuit elements due to the two-stage structure. Therefore, the AC-DC converter having the aforementioned two-stage structure is not suitable for low power applications such as indoor electric lights in terms of design or cost.

In order to solve the aforementioned problems, the use of an AC-DC converter having a single-stage structure employing a link capacitor may be proposed. In the AC-DC converter of the single-stage structure, one controller may be provided and the number of required circuit elements may be reduced. In this regard, it may be recommended to apply the AC-DC converter of the aforementioned single-stage structure to low power applications such as indoor electric lights.

However, in the AC-DC converter of the aforementioned single-stage structure, capability for reducing ripples of an input voltage is lower than that of the AC-DC converter of the two-stage structure. Therefore, when the conventional AC-DC converter of the aforementioned single-stage structure is applied to low power applications in order to drive an LED lamp, there is a problem that flicker occurs and color change is caused.

The aforementioned problems of the conventional AC-DC converter of the single-stage structure may be solved using a link capacitor having large capacitance. However, when the capacitor has large capacitance, the size of the capacitor increases. Therefore, it is not preferable to configure an AC-DC converter by employing a capacitor having a large size in order to realize low power applications.

Furthermore, for an AC-DC converter to be employed for low power applications, a method capable of reducing ripples of an output current should be considered.

DISCLOSURE

Technical Problem

Various embodiments are directed to a power circuit for LED lamp driving capable of reducing ripples of an output current by employing a valley fill circuit, a power supply method, and a primary side control circuit of a flyback transformer.

Also, various embodiments are directed to a power circuit for LED lamp driving in which a circuit configuration is simple by employing a discontinuous conduction mode (hereinafter, referred to as "DCM")-DCM and a link voltage is stable, a power supply method, and a primary side control circuit of a flyback transformer.

Further, various embodiments are directed to a power circuit for LED lamp driving capable of reducing ripples of an input voltage of a flyback transformer and having a two-stage structure including a boost power factor correction converter and the flyback converter, a power supply method, and a primary side control circuit of the flyback transformer.

Further, various embodiments are directed to a power circuit for LED lamp driving in which a boost inductor with large inductance is available and a high reverse voltage is applicable, a power supply method, and a primary side control circuit of a flyback transformer.

Technical Solution

A power circuit for driving an LED lamp according to the present invention includes: a rectification circuit that outputs a rectified voltage; a boost inductor that outputs a boost current corresponding to the rectified voltage; a flyback transformer that outputs an output current corresponding to an input current of a primary side from a secondary side; a switching circuit that is switched by a pulse type signal to control a flow of the input current of the primary side of the flyback transformer; a valley fill circuit that selectively performs providing of the input current to the flyback transformer by energy accumulated in the valley fill circuit and accumulating of the energy in the valley fill circuit by using the boost current, according to switching of the switching circuit; and a boost switching circuit that selectively performs providing of a path for increasing the boost current to the boost inductor and providing of a path for providing the input current by the energy accumulated in the valley fill circuit to the primary side of the flyback transformer, according to the switching of the switching circuit.

A power circuit according to the present invention includes: a boost power factor correction converter that performs first power factor correction for a rectified voltage in a first discontinuous conduction mode and provides a boost current for forming a link voltage; and a flyback DC-DC converter that performs second power factor correction for the link voltage formed by the boost current in a second discontinuous conduction mode, wherein the flyback DC-DC converter includes: a flyback transformer that induces an input current of a primary side and outputs an output current from a secondary side; a switching circuit that is switched by a pulse type signal to control a flow of the input current of the primary side of the flyback transformer; a valley fill circuit that selectively performs providing of the input current to the flyback transformer by energy accumulated in the valley fill circuit and accumulating of the energy in the valley fill circuit by using the boost current, according to switching of the switching circuit; and a boost switching circuit that selectively performs providing of a path for increasing the boost current to a boost inductor and providing of a path for providing the input current by the energy accumulated in the valley fill circuit to the primary side of the flyback transformer, according to the switching of the switching circuit.

A primary side control circuit of a flyback transformer according to the present invention, which that provides an input current to a primary side of the flyback transformer that performs DC-DC converting, includes: a boost power factor correction converter that provides a boost current in correspondence with a rectified voltage; a switching circuit that is switched by a pulse type signal to control a flow of the input current of the primary side of the flyback transformer; a valley fill circuit that selectively performs providing of the input current to the flyback transformer by energy accumulated in the valley fill circuit and accumulating of the energy in the valley fill circuit by using the boost current, according to switching of the switching circuit; and a boost switching circuit that selectively performs providing of a path for increasing the boost current to a boost inductor and providing of a path for providing the input current by the energy accumulated in the valley fill circuit to the primary side of the flyback transformer, according to the switching of the switching circuit.

A power supply method for driving an LED lamp according to the present invention includes: a step in which a boost power factor correction converter provides a boost current obtained by performing first power factor correction for a rectified voltage in a first discontinuous conduction mode; a step in which a switching circuit connected to a primary side of a flyback transformer is turned on; a step in which a pair of capacitors in a valley fill circuit are equivalently connected in parallel with each other according to turn-on of the switching circuit, and an input voltage is provided to the primary side of the flyback transformer by using energy accumulated in the pair of capacitors; a step in which a path for accumulation of the boost current of the boost power factor correction converter is formed according to the turn-on of the switching circuit; and a step in which the pair of capacitors in the valley fill circuit are equivalently connected in series with each other according to turn-off of the switching circuit, and the energy is accumulated in the pair of capacitors by the boost current.

Advantageous Effects

Consequently, according to the present invention, ripple components existing in the output of the boost power factor correction converter can be reduced by the valley fill circuit, and an input voltage with reduced ripples is provided to the primary side of the flyback converter, so that ripples of an output current of the flyback converter is reduced.

Furthermore, according to the present invention, the DCM-DCM is employed, so that a circuit can be simply realized and a link voltage is stable.

Furthermore, according to the present invention, a boost inductor with large inductance can be used, a high reverse voltage can be applied, and capacitor voltage stress is distributed.

MODE FOR INVENTION

Hereafter, exemplary embodiments of the present invention will be described in detail with reference to the accompanying drawings.

Figure 1:
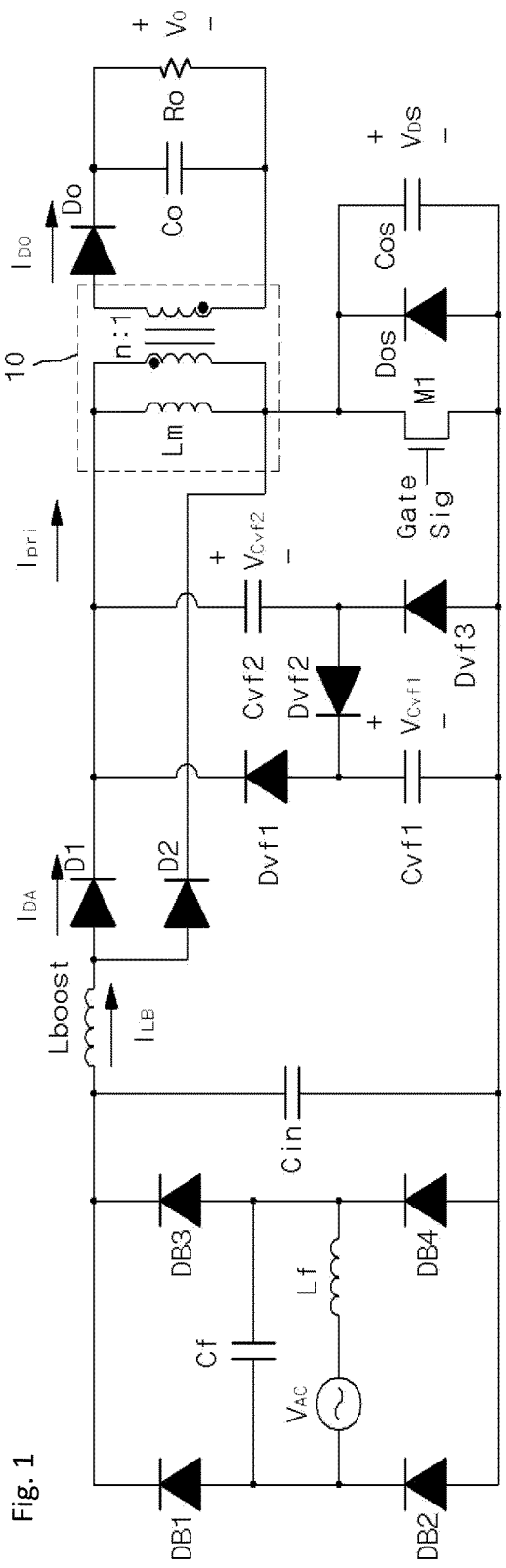
FIG. 1 is a circuit diagram illustrating a preferable embodiment of a power circuit for LED light driving according to the present invention.

An embodiment according to the present invention may have a configuration as illustrated in FIG. 1. The embodiment of FIG. 1 has a two-stage structure including a boost power factor correction converter that performs first power factor correction with a first DCM and provides a boost current ($I_{LB}$) and a flyback Dc-DC converter that performs second power factor correction with a second DCM.

The boost power factor correction converter includes a rectification circuit that outputs a rectified voltage and a boost inductor (Lboost) that receives the output of the rectification circuit and provides the boost current (ILB).

The rectification circuit includes an AC power source ($V_{AC}$), a filter inductor (Lf) serially connected to the AC power source ($V_{AC}$), a filter capacitor (Cf) connected in parallel with the AC power source ($V_{AC}$) and the filter inductor (Lf) serially connected to each other, bridge diodes (DB1, DB2, DB3, DB4) configured to full-wave rectify the sine wave output of the AC power source ($V_{AC}$), and an input capacitor (Cin) to which the output of the bridge diodes (DB1, DB2, DB3, DB4) is applied.

The flyback Dc-DC converter has a configuration including a flyback transformer (10), a switching circuit (M1), a valley fill circuit, and a boost switching circuit.

The flyback transformer (10) is configured to receive a current through a primary side (LM) by a flyback operation, and to output a current induced to the current of the primary side (LM) from a secondary side, thereby performing DC-DC converting. The flyback transformer (10) may further include an output diode (Do) to which an output current of the secondary side is applied, and an output capacitor (Co) to which an output voltage (Vo) is applied. In FIG. 1, a resistor (Ro) connected in parallel with the output capacitor (Co) indicates an LED lamp that is a load.

The flyback transformer (10) may have a reverse type, and the reverse type flyback transformer (10) indicates a transformer in which a current is induced to a secondary side in a direction opposite to the flow of a current of a primary side.

A turn ratio between the primary side and the secondary side of the flyback transformer (10) may be defined as n:1 (n is a natural number).

The switching circuit (M1) may include a NMOS transistor connected to the primary side (LM) of the flyback transformer (10). The switching circuit (M1) performs a switching operation as a pulse width modulation signal, that is, a pulse signal having a predetermined duty ratio is applied as a gate signal (Ggate Sig). In FIG. 1, a diode (Dos) connected in parallel with the switching circuit (M1) is for preventing a reverse current flow due to a parasitic current, and a capacitor (Cos) receives a voltage ($V_{DS}$) between both terminals of the switching circuit (M1) and charges energy based on the parasitic current.

The boost switching circuit includes diodes (D1, D2) connected in parallel with the boost inductor (Lboost). The diode (D1) is connected to a node, to which the valley fill circuit and one end of the primary side (Lm) of the flyback transformer (10) are connected, in a forward direction, and the diode (D2) is connected to a node between the primary side (Lm) of the flyback transformer (10) and the switching circuit (M1) in a forward direction.

The boost switching circuit having the aforementioned configuration selectively performs providing of a path including the boost inductor (Lboost) and the switching circuit (M1)

in order to increase the boost current (I.sub.LB) of the boost inductor (Lboost) and providing of a path through which the boost current is transferred to the capacitors (Cvf1, Cvf2) of the valley fill circuit. The aforementioned operation of the boost switching circuit is performed according to the turn-on and turn-off states of the switching circuit (M1).

The valley fill circuit includes a pair of capacitors (Cvf1, Cvf2) and three diodes (Dvf1, Dvf2, Dvf3).

In the valley fill circuit, the diode (Dvf1) and the capacitor (Cvf2) are connected in parallel with one end of the flyback transformer (10), and the capacitor (Cvf1) is connected in series with the diode (Dvf1). The diode (Dvf1) is configured to allow a forward current to flow from the capacitor (Cvf1) to the flyback transformer (10). Furthermore, the diode (Dvf3) is configured to allow a forward current to flow from the ground to the capacitor (Cvf2). Furthermore, the diode (Dvf2) is configured to allow a forward current to flow from the capacitor (Cvf2) to the capacitor (Cvf1).

According to the aforementioned configuration, the valley fill circuit provides a path through which the pair of capacitors (Cvf1, Cvf2) equivalently connected in parallel with each other in correspondence with the turned-on state of the switching circuit (M1) supplies the input voltage of the flyback transformer (10) to the primary side (Lm), or a path through which the boost current ($I_{LB}$) of the boost inductor (Lboost) is transferred to the pair of capacitors (Cvf1, Cvf2) equivalently connected in series with each other in correspondence with the turned-off state of the switching circuit (M1). That is, the valley fill circuit selectively performs an operation for supplying energy accumulated in the pair of capacitors (Cvf1, Cvf2) to the flyback transformer (10) and an operation for accumulating energy in the pair of capacitors (Cvf1, Cvf2) by using the boost current ($I_{LB}$), according to the switching state of the switching circuit (M1).

In FIG. 1, $I_{LB}$ denotes a boost current flowing through the boost inductor (Lboost), $I_{D4}$ denotes a current flowing through the diode (D1), $I_{pri}$ denotes a current introduced into the primary side (Lm) of the flyback transformer (10), $V_{link}$ denotes a link voltage, $V_{cvf1}$ denotes a voltage applied to the capacitor (Cvf1), $V_{cvf2}$ denotes a voltage applied to the capacitor (Cvf2), $V_{DS}$ denotes a voltage applied to the capacitor (Cos), and $V_o$ denotes an output voltage of the flyback transformer (10) applied to the load (Ro) or the capacitor (Co). The link voltage $V_{link}$ denotes a voltage between a node (+) connected to the diode (D1) and the primary side (Lm) of the flyback transformer (10) and the ground (−).

Figure 2:
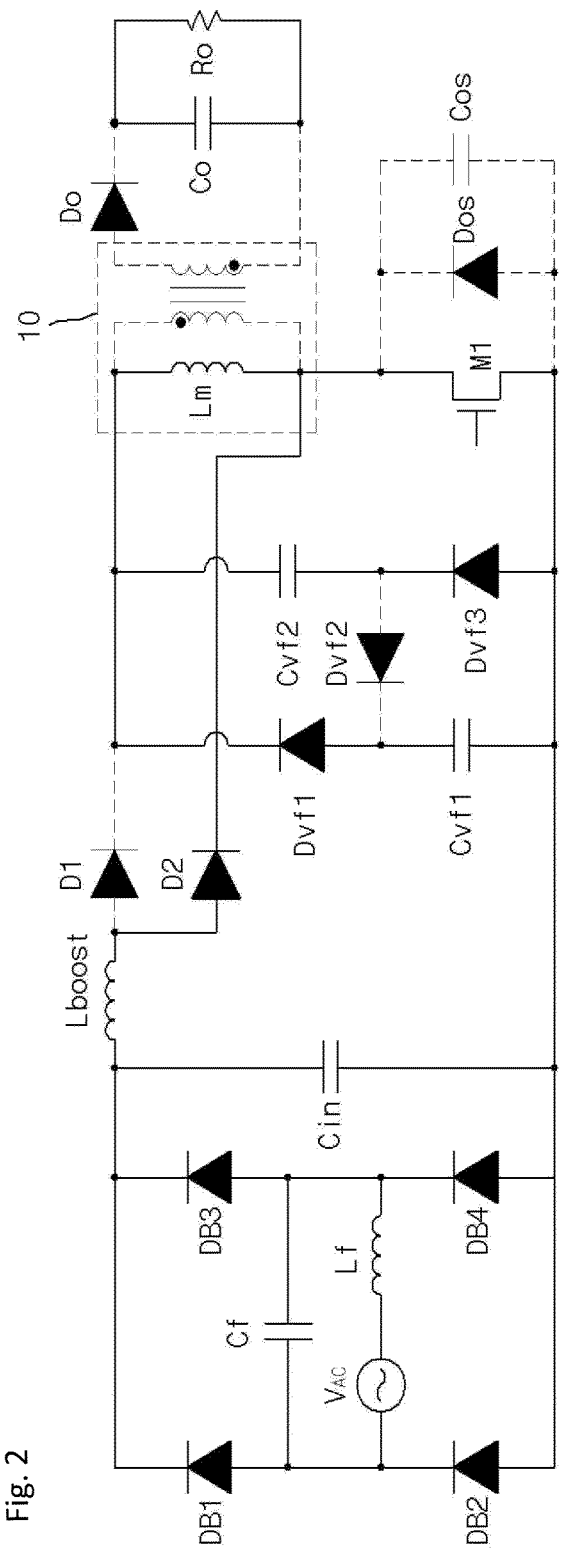
FIGS. 2 to 6 are circuit diagrams for explaining an operation of an embodiment of FIG. 1 according to modes.
Figure 3:
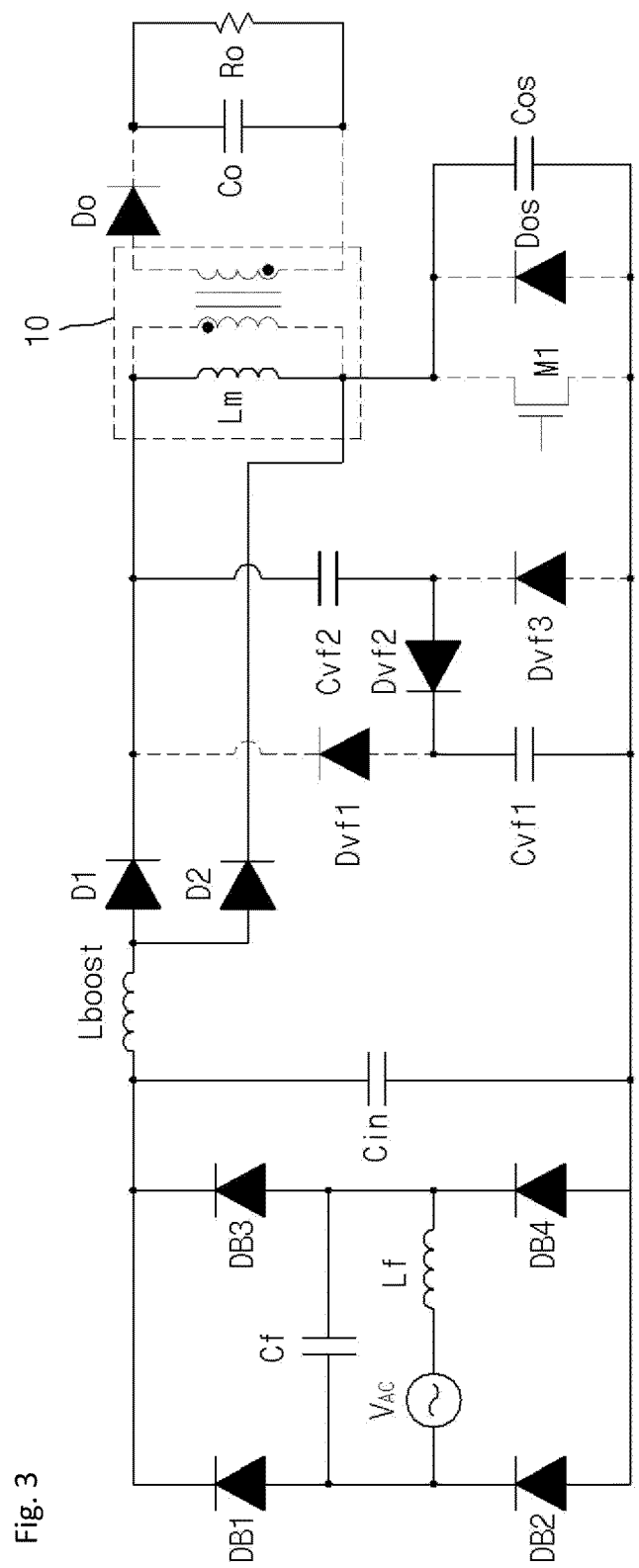
Figure 4:
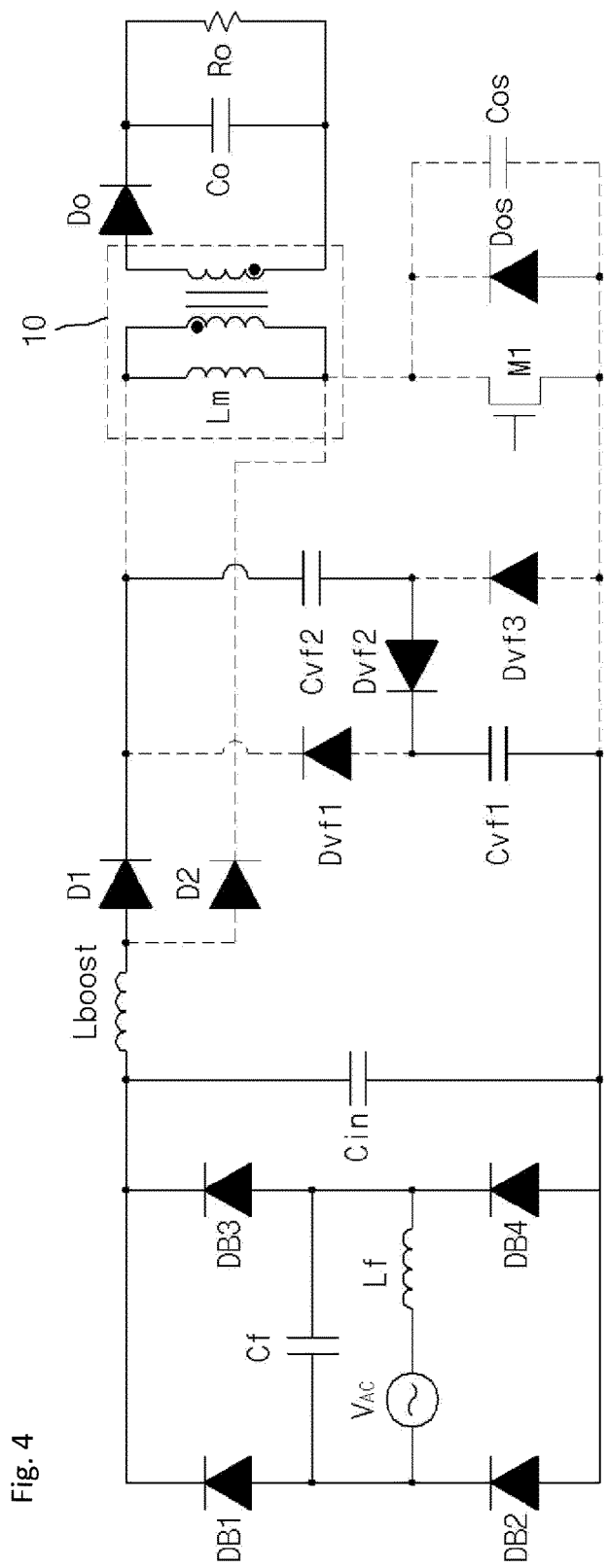
Figure 5:
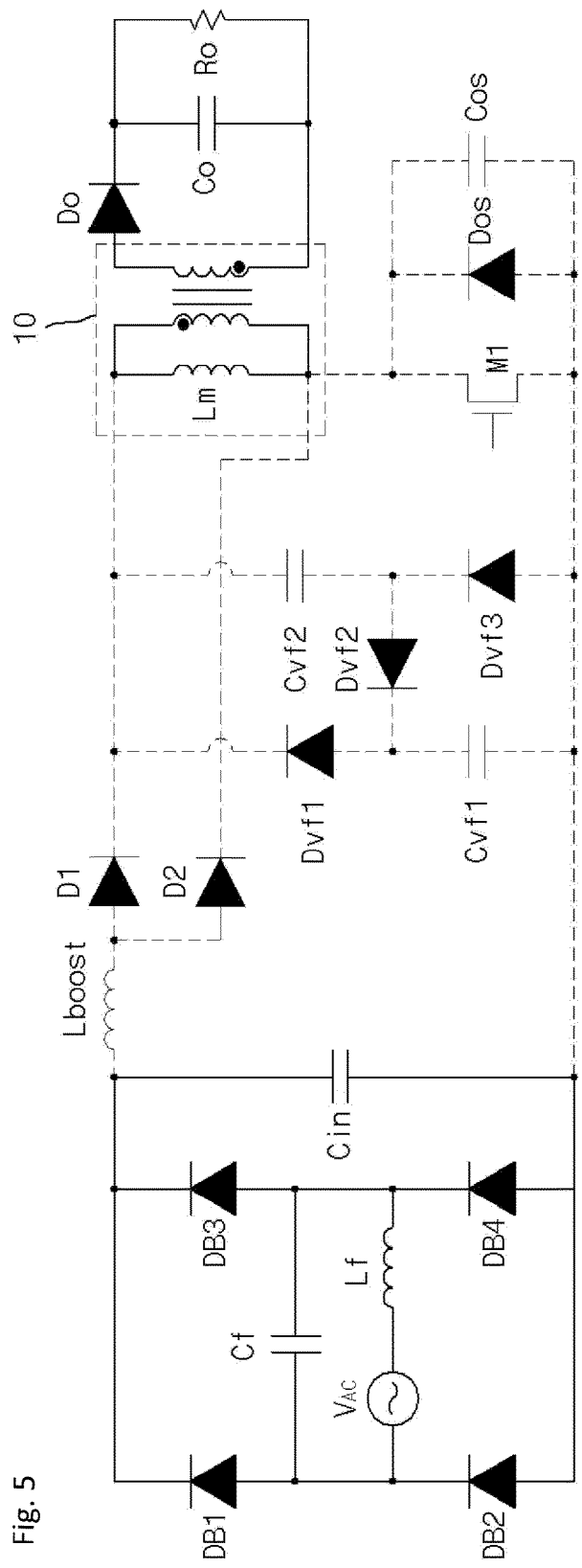
Figure 6:
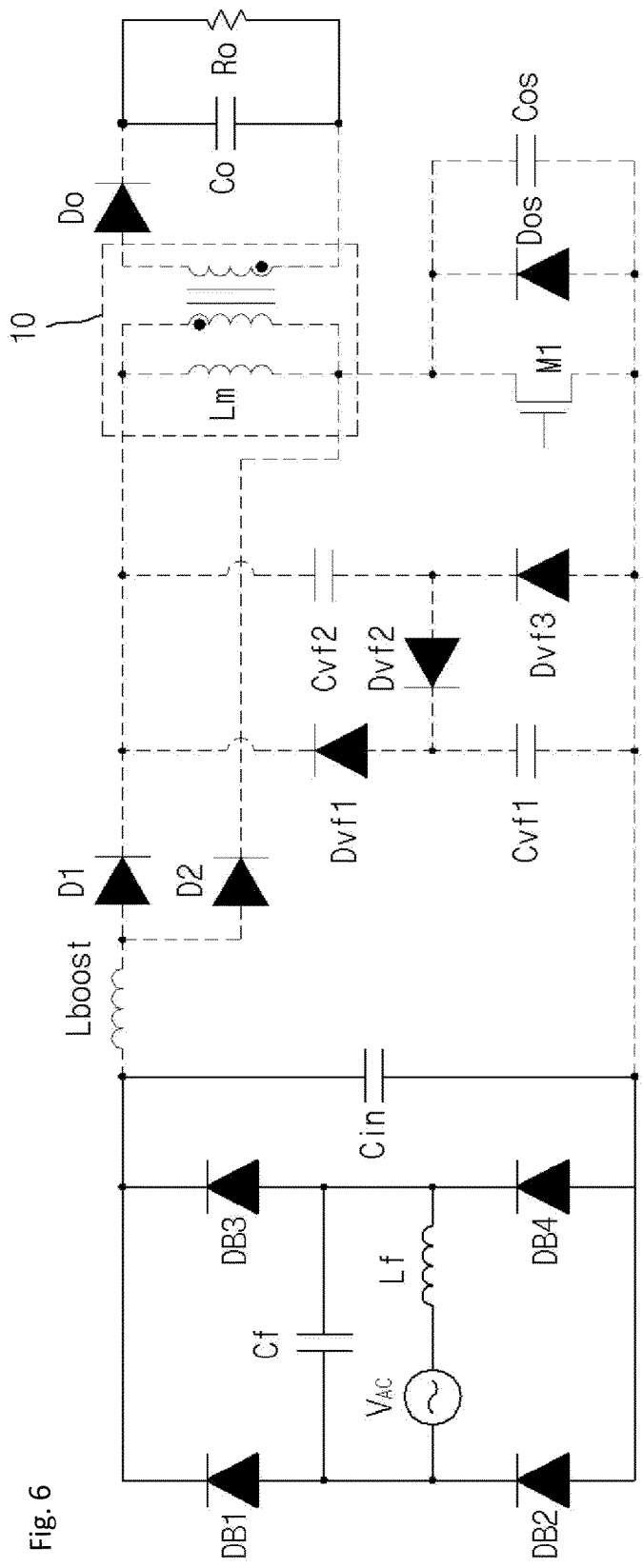
Figure 7:
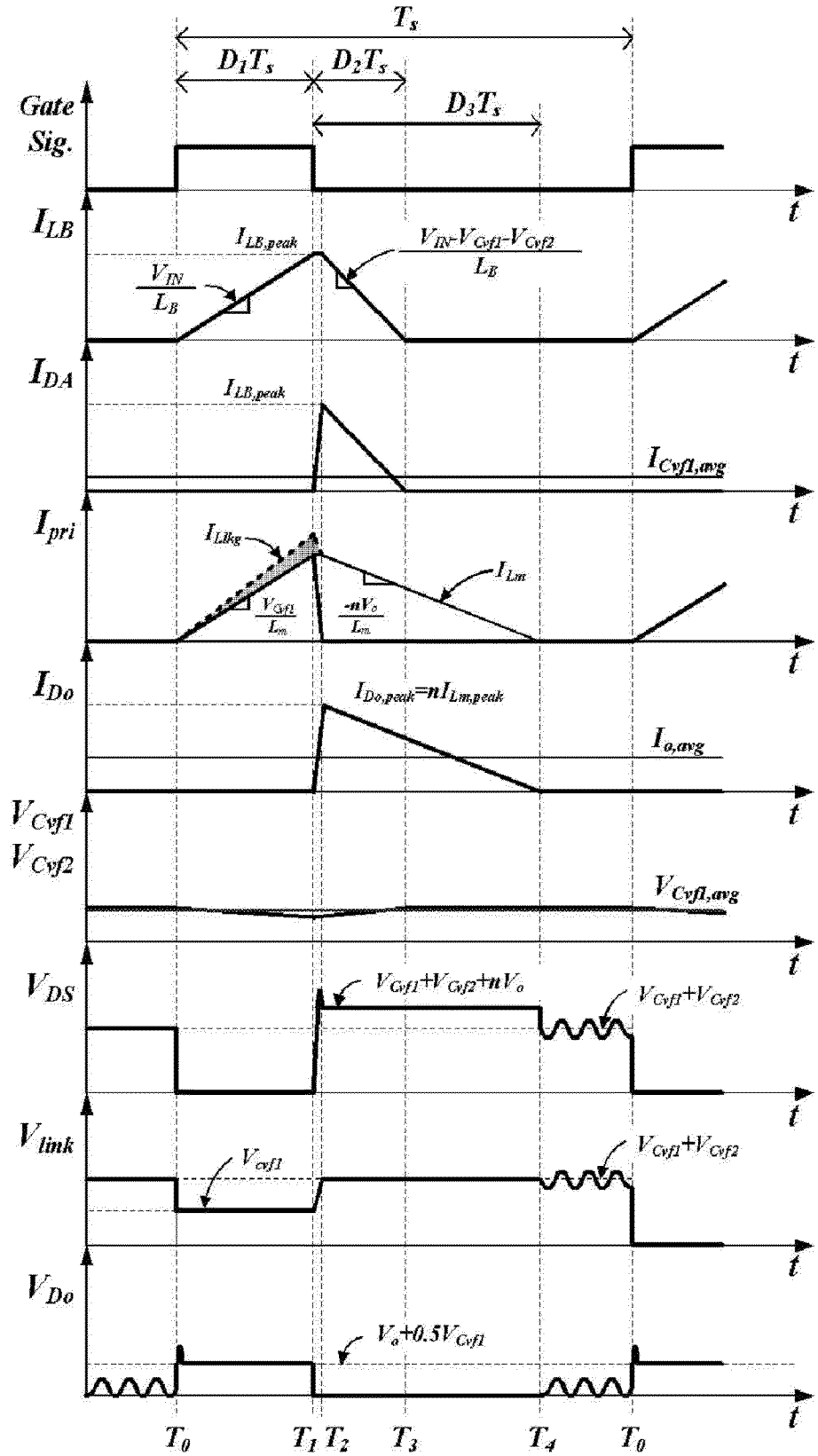
FIG. 7 is a waveform diagram of an embodiment of FIG. 1.
Figure 8:
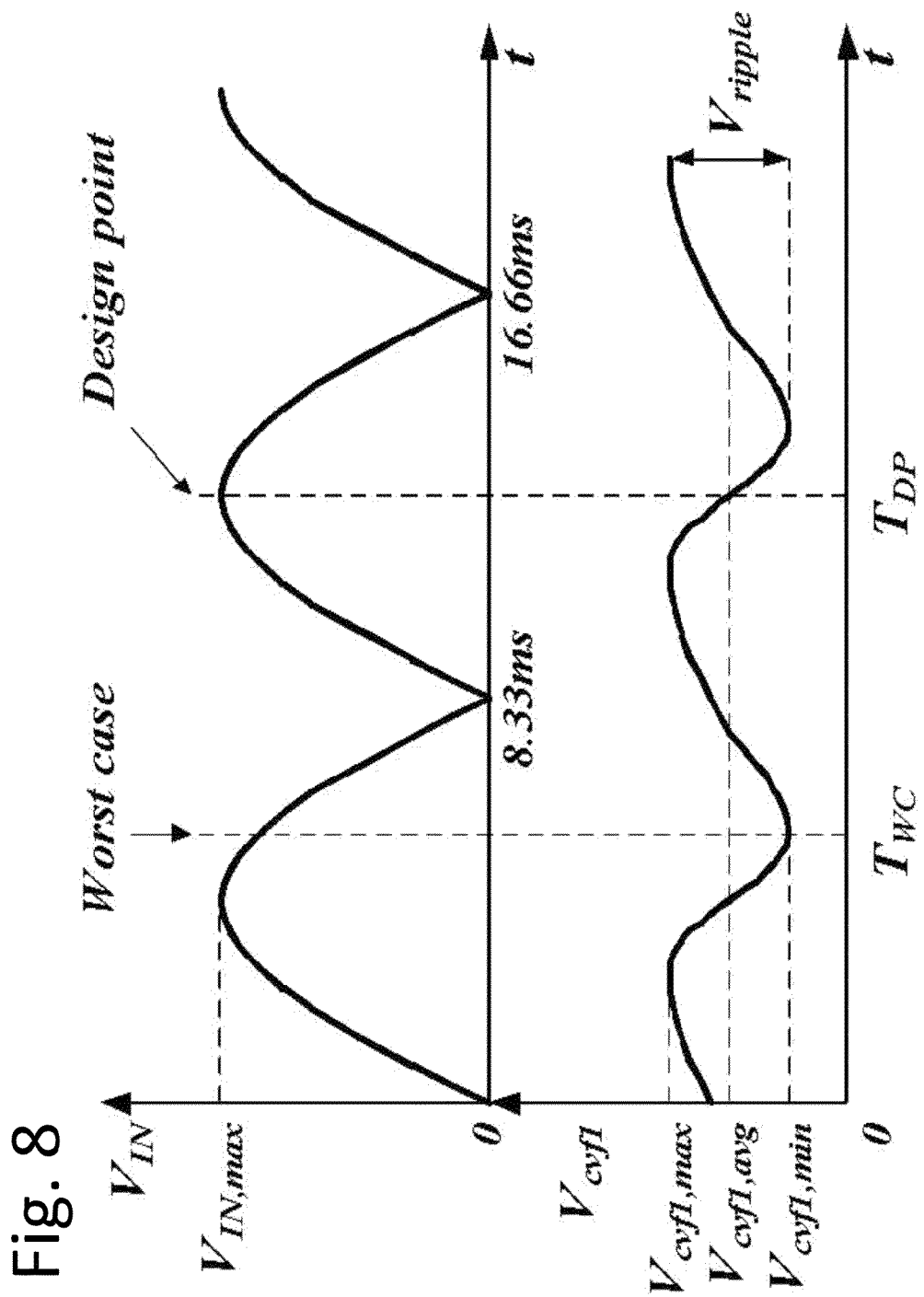
FIG. 8 is a waveform diagram of voltages illustrated in consideration of a design point.

The operation of the embodiment according to the present invention configured as described above will be described with reference to FIG. 2 to FIG. 6. FIG. 2 to FIG. 6 illustrate a sequential change of a partial activation state of the embodiment of FIG. 1 according to a mode change. The operation of the embodiment according to the present invention may be described with reference to the waveform diagram of FIG. 7. For the purpose of convenience, the state of FIG. 2 is defined as mode 1, the state of FIG. 3 is defined as mode 2, the state of FIG. 4 is defined as mode 3, the state of FIG. 5 is defined as mode 4, and the state of FIG. 6 is defined as mode 5.

The mode 1 of FIG. 2 is started when the switching circuit (M1) is turned on at a time point T0.

At the time point at which the switching circuit (M1) is turned on, the boost inductor (Lboost) does not accumulate energy, and when the switching circuit (M1) is turned on, the diode (Dvf2) of the valley fill circuit is in a reverse bias state and is thus turned off.

Accordingly, the pair of capacitors (Cvf1, Cvf2) are equivalently connected in parallel with each other with respect to the primary side (LM) of the flyback transformer (10).

In the mode 1 state, voltages (Vcvf1, Vcvf2) of the pair of capacitors (Cvf1, Cvf2) equivalently connected in parallel with each other are equal to each other, and the link voltage (Vlink) serving as the input voltage of the flyback transformer (10) is equal to the voltages (Vcvf1, Vcvf2) of the pair of capacitors (Cvf1, Cvf2).

Furthermore, the current (Ipri) the primary side (Lm) of the flyback transformer (10) starts to increase by the link voltage (Vlink).

That is, in the mode 1, the voltages (Vcvf1, Vcvf2) of the pair of capacitors (Cvf1, Cvf2) equivalently connected in parallel with each other are supplied to the primary side (Lm) as input voltages of the flyback transformer (10). As a result, the voltages (Vcvf1, Vcvf2) of the pair of capacitors (Cvf1, Cvf2) are reduced and energy is accumulated in the primary side (Lm) of the flyback transformer (10).

The embodiment according to the present invention has an effect that the input voltages of the flyback transformer (10) are provided by the pair of capacitors (Cvf1, Cvf2) equivalently connected in parallel with each other in the mode 1, so that an output current ripple component is reduced.

In more detail, ripples of the input voltages applied to the primary side (Lm) of the flyback transformer (10) are formed at a half cycle of ripples of a voltage that is output after being subject to first power factor correction in the rectification circuit. This is a result obtained when the ripples of the voltage output after being subject to the first power factor correction in the rectification circuit are divided at a half cycle by the pair of capacitors (Cvf1, Cvf2) connected in parallel with each other.

Consequently, in the mode 1, second power factor correction for the input voltages applied to the primary side (Lm) of the flyback transformer (10) can be performed by the pair of capacitors (Cvf1, Cvf2) equivalently connected in parallel with each other of the valley fill circuit, and the input voltages of the flyback transformer (10) can have a high duty ratio.

In the mode 1 state, the path through which the boost current (ILB) of the boost inductor (Lboost) flows includes the diode (D2) included in the boost switching circuit and the switching circuit (M1), so that the boost current (ILB) starts to increase and energy starts to be accumulated in the boost inductor (Lboost).

The operation of the aforementioned mode 1 of FIG. 2 is maintained for the turn-on of the switching circuit (M1).

At the time point (T1) at which the switching circuit (M1) is turned off, the mode 1 of FIG. 2 is switched to the mode 2 of FIG. 3. The mode 2 of FIG. 3 is ended at a time point (T2) at which a leak current is extinguished in the process in which the switching circuit (M1) maintains the turned-off state.

The mode 2 of FIG. 3 indicates a temporary state in which the mode 1 is transitioned to the mode 3. In the mode 2, energy accumulated in a leak inductor (not illustrated) formed by an interconnection is transferred to the capacitor (Cos) connected in parallel with the switching circuit (M1), so that a voltage applied to the capacitor (Cos) has a peak value.

In the mode 2, the diode (D1) and the diode (Dvf2) are changed to a forward bias state and are turned on, so that the boost current (ILB) of the boost inductor (Lboost) starts to flow through the capacitors (Cvf1, Cvf2) equivalently connected in series with each other.

The mode 2 of FIG. 3 is ended when the diode (D2) is changed to a reverse bias state (T2), and then the state of the mode 2 of FIG. 3 is changed to a state of the mode 3 of FIG. 4.

In the mode 3, the switching circuit (M1) maintains the turned-off state and a flyback operation is performed. The energy stored in the primary side (Lm) of the flyback transformer (10) is transferred to the secondary side by the flyback operation.

Furthermore, in the mode 3, the energy accumulated in the boost inductor (Lboost) is transferred to the pair of capacitors (Cvf1, Cvf2) included in the valley fill circuit and equivalently connected in series with each other, and the boost current (ILB) of the boost inductor (Lboost) is reduced.

That is, in the valley fill circuit, the pair of capacitors (Cvf1, Cvf2) maintain the equivalently serially connected state by the turn-on of the diode (Dvf2) changed to the forward bias state, so that a path through which the energy accumulated in the boost inductor (Lboost) is transferred to the pair of capacitors (Cvf1, Cvf2) can be formed.

The summed voltage of the capacitors (Cvf1, Cvf2) equivalently connected in series with each other serves as a reverse bias voltage. The reverse bias voltage needs to have a value higher than that of a peak voltage of an input source.

Thus, the high reverse bias voltage may serve as stress to a capacitor element, but in the embodiment according to the present invention, the reverse bias voltage is formed by the two capacitors (Cvf1, Cvf2) connected in series with each other, so that voltage stress can be distributed.

Consequently, in the embodiment according to the present invention, it is possible to obtain an effect capable of covering a reverse bias voltage having a voltage range of 400 V or more by using a commercial capacitor having a low breakdown voltage, and it is possible to configure a circuit using a high reverse bias voltage.

Furthermore, by the embodiment according to the present invention, the DCM operation by the boost current ($I_{LB}$) of the boost inductor (Lboost) can be easily maintained.

The aforementioned mode 3 of FIG. 4 may be maintained up to a time point (T3) at which the boost current ($I_{LB}$) of the boost inductor (Lboost) reaches a zero level.

After the mode 3, in the state in which the switching circuit (M1) maintains the turned-off, the mode 4 of FIG. 5 starts. The mode 4 of FIG. 5 is a state in which the boost current ($I_{LB}$) is reduced and all the switching circuit (M1) and the diodes (D1, D2, Dcf1, Dcf2, Dcf3, Dos) have been turned off.

Furthermore, the current of the primary side (Lm) of the flyback transformer (10) is continuously reduced, and the mode is ended at a time point (T4) at which a current (IDo) induced to the secondary side of the flyback transformer (10) and flowing through the diode (Do) reaches a zero level.

After the mode 4 of FIG. 5, in the state in which the switching circuit (M1) maintains the turned-off, the mode 5 of FIG. 6 is followed and is an idle period in which it is maintained up to a time point (T5) before the switching circuit (M1) is turned on.

In the embodiment according to the present invention as described above, the switching operation of the switching circuit (M1), that is, the turn-on state and the turn-off state are repeated, so that the states of FIG. 2 and FIG. 4 are repeated and it is possible to drive a low power application such as an indoor LED lamp including a load.

Furthermore, in accordance with the embodiment according to the present invention, the valley fill circuit is employed in order to drive an LED lamp, so that a ripple component can be reduced, a link voltage can be stable, and a circuit for driving the LED lamp can be simply realized by employing the DCM-DCM.

Furthermore, in accordance with the embodiment according to the present invention, the power circuit of the two-stage structure including the boost power factor correction converter and the flyback converter can be configured, and can drive a low power application such as an LED lamp.

Furthermore, in accordance with the embodiment according to the present invention, the boost inductor having large capacitance can be used and stress of a reverse voltage can be distributed to serially connected capacitors, so that a high reverse voltage can be applied.

<Voltage Transfer Function>

The aforementioned embodiment according to the present invention may be divided into two parts and gain transfer functions of the two parts may be independently calculated.

When the switching circuit (M1) is in a turn-off state, energy accumulated in the boost inductor (Lboost) is transferred to the capacitors (Cvf1, Cvf2) connected in series with each other. At this time, the capacitors (Cvf1, Cvf2) serve as output capacitors of the boost power factor correction converter as illustrated in FIG. 4. The output voltage of the boost power factor correction converter is twice as large as Vcvf1. The load is expressed by a resistor (Ro) that is an LED lamp.

A charge balance equation may be obtained from the waveform of the current IDA as expressed by <Equation 1>.

$$\frac{1}{2}(D_2 T_s) I_{LB,peak} = I_{Cvf1,avg} T_s \qquad \text{Equation 1}$$

In Equation 1 above, multiplication of D2 and Ts denotes a time at which a diode DA is conducted (DA is a diode indicated by D1 in the circuit diagram), that is, a time required when the current of the boost inductor is reduced from a maximum value to 0, $I_{LB,peak}$ denotes a maximum current value of the boost inductor, $I_{Cvf1,avg}$ denotes an average of a current flowing through the capacitor constituting the valley fill circuit, and $T_s$ denotes a switching time of one cycle.

An average current of the capacitor (Cvf1) may be expressed by the resistor (R0) and is twice as large as a storage capacitor voltage (Vcvf1).

The ratio of the storage capacitor voltage (Vcvf1) and an input voltage (VIN) may be expressed by <Equation 2> when a PFC (Power Factor Correction) step operates in the DCM state from a voltage second balance of the boost inductor (Lboost).

$$M_1 = \frac{V_{Cvf1}}{V_{IN}} = \frac{1}{4} + \frac{1}{4}\sqrt{1 + \frac{2 D_1^2 R_e}{L_B f_{sw}}} \qquad \text{Equation 2}$$

In Equation 2 above, $M_1$ denotes a voltage gain of the boost converter terminal in an entire circuit, $V_{cvf1}$ denotes a storage capacitor voltage, $V_{IN}$ denotes an input voltage, $D_1$ denotes a duty cycle at which the switch is turned on, $R_e$ denotes an effective resistance value of an output resistor in the boost converter, $L_B$ denotes inductance of the boost converter, and $f_{sw}$ denotes a switching frequency.

While the switching circuit (M1) is being turned on, the capacitors are connected in parallel with each other as illustrated in FIG. 2. The energy accumulated in the capacitors (Cvf1, Cvf2) is transferred to the flyback transformer (10). The operation is the same as the flyback converter operation in the DCM state. As described above, the gain transfer function may be expressed by <Equation 3>.

$$M_2 = \frac{V_0}{V_{Cvf1}} = D_1 \sqrt{\frac{R_0}{2L_m f_{sw}}} \qquad \text{Equation 3}$$

In Equation 3 above, $M_2$ denotes a voltage gain of the flyback converter, $V_o$ denotes an output voltage, $V_{cvf1}$ denotes a storage capacitor voltage, $D_1$ denotes a duty cycle at which the switch is turned ON, $L_m$ denotes magnetizing inductance of the transformer, and $f_{sw}$ denotes a switching frequency.

In <Equation 3> above, the resistor (Ro) denotes the flyback converter and the load. An Equation expressing the resistor may be expressed by <Equation 4> by using a loss free resistor concept.

$$R_e = R_o \left(\frac{2}{M_2}\right)^2 = \frac{8L_m f_{sw}}{D_1^2} \qquad \text{Equation 4}$$

In Equation 4 above, $R_e$ denotes effective resistance of the output resistor (Ro) in the output of the boost converter.

Thus, the gain transfer function in the PFC step may be expressed again by <Equation 5>.

$$M_1 = \frac{V_{cvf1}}{VIN} + \frac{1}{4} + \frac{1}{4}\sqrt{1 + \frac{1 + 16L_m}{L_B}} \qquad \text{Equation 5}$$

In Equation 5 above, $L_B$ denotes inductance of the boost inductor.

From <Equation 3> and <Equation 5>, the gain transfer function of the power circuit of the embodiment according to the present invention may be expressed as follows.

$$M = \frac{V_o}{V_{IN}} = \frac{D_1}{4}\left(1 + \frac{\sqrt{1 + 16L_M}}{L_B}\right)\sqrt{\frac{R_o}{2L_m f_s}} \qquad \text{Equation 6}$$

In Equation 6 above, $f_s$ denotes a switching frequency.

Equation 6 indicates an entire gain transfer function of the power circuit of the embodiment according to the present invention for one switching cycle.

<Design Consideration>

In order to design the power circuit of the embodiment according to the present invention, the voltage stress of the capacitors (Cvf1, Cvf2) of the valley fill circuit is first decided. The maximum voltage of the capacitors (Cvf1, Cvf2) of the valley fill circuit relates to the voltage stress of the switching circuit (M1). After the rated voltage of the switching circuit (M1) is decided, the maximum voltage of the capacitors (Cvf1, Cvf2) of the valley fill circuit may be decided. The maximum voltage of the capacitors (Cvf1, Cvf2) of the valley fill circuit is an important parameter for deciding the operation of the boost inductor (Lboost). In the voltage second balance for the boost inductor (Lboost), the state of the current ($I_{LB}$) of the boost inductor (Lboost) for maintaining the DCM operation may be expressed by <Equation 7>.

$$D1 < 1 - \frac{V_{IN}}{V_{cvf1} + V_{cvf2}} \qquad \text{Equation 7}$$

In order to obtain a unique PFC result of the boost power factor correction converter, the boost inductor current ($I_{LB}$) is required to maintain the DCM operation. In the worst case for maintaining the DCM operation, the voltages Vcvf1 and Vcvf2 have a low input voltage due to the lowest level state. In the aforementioned state, the voltage of the capacitor of the valley fill circuit may be approximately considered as a ⅓ of a maximum value. However, the input voltage (VIN) may not be known in the worst case as illustrated in FIG. 5. As described above, the new design point is required instead of the worst case. At a point $T_{DP}$, the input voltage (VIN) has a maximum value and Vcvf1 is in an average state. Based on the above assumption, the voltage ripples of Vcvf1 are sufficiently small to be ignorable. As described above, a maximum input voltage is used as the input voltage (VIN) for the calculation of <Equation 7>. A maximum duty ratio may be decided according to the result.

The inductance of the flyback transformer (10) may be calculated by <Equation 8>. <Equation 8> may be obtained from the charge balance equation of the FIG. 4 state.

$$LM = \frac{D_1^2 V_{cvf1}^2 R_o}{2 V_o^2 f_{sw}} \qquad \text{Equation 8}$$

A turn ratio of the flyback transformer (10) may be calculated by <Equation 9>. Using <Equation 9>, a minimum turn ratio for maintaining the DCM operation of the boost current is decided. In the DCM operation, current ripples are essentially large. In this regard, it is preferable to use a small turn ratio if possible. If the turn ratio is large, an RMS current of the output capacitor increases, and the size of the output capacitor should be increased.

$$n > \frac{D_1 V_{cf1}}{(1 - D_1) V_o} \qquad \text{Equation 9}$$

In <Equation 5>, the inductance of the boost inductor (Lboost) may be decided. For calculation, an input voltage is an RMS value. The above Equation may be expressed again by <Equation 10>.

$$LM = \frac{V_{IN}}{V_{cvf1}}\left(\frac{V_{IN}}{V_{cvf1} - 0.5 V_{IN}}\right) \qquad \text{Equation 10}$$

The capacitance of the capacitors of the valley fill circuit may be decided as follows.

The capacitors (Cvf1, Cvf2) serve as the output capacitor of the boost power factor correction converter and the input capacitor of the flyback converter. A peak current may be calculated by selecting parameter values. The capacitance of the capacitors of the valley fill circuit may be decided as expressed by <Equation 11>. The capacitors (Cvf1, Cvf2) are assumed to have the same capacitance.

$$C_{vf1} = \frac{1}{2}\frac{L_B I_{LB,peak}^2}{\Delta V_{cvf1}^2} \qquad \text{Equation 11}$$

The capacitance of the capacitors of the valley fill circuit is sufficiently large enough for attenuating low frequency voltage ripples. The capacitance of the output capacitor (Co) may be decided by the charge balance equation.

$$C_o = \frac{I_o}{f_{sw}\Delta V_o}$$ Equation 12

According to the procedure, values of key components for the power circuit of the embodiment according to the present invention may be designed.

Figure 9:
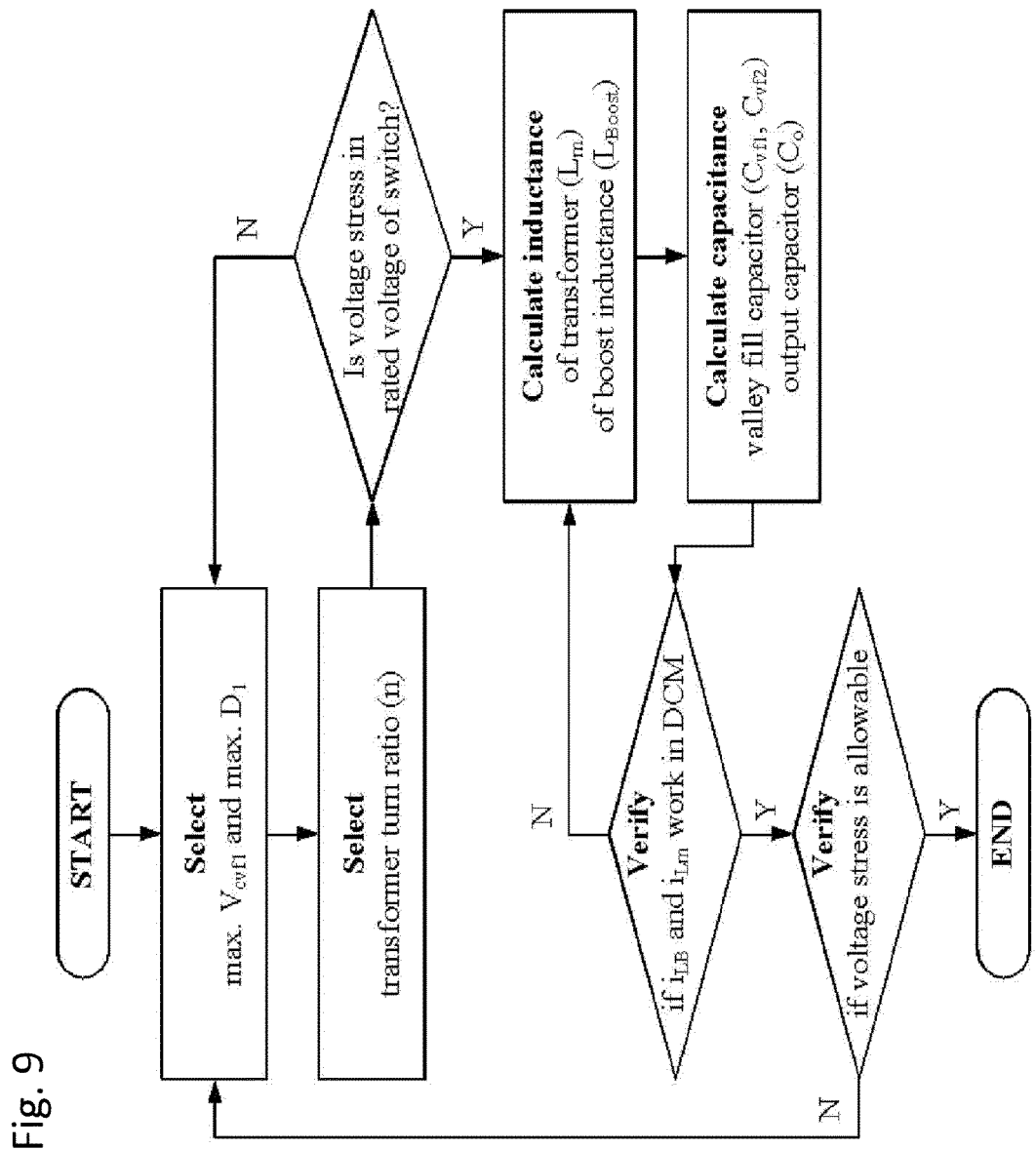
FIG. 9 is a flowchart illustrating an entire design flow for a converter according to the present invention.

FIG. 9 illustrates an entire design flow for the power circuit of the embodiment according to the present invention.

<Experimental Results>

In order to confirm the effectiveness of the topology according to the present invention, a proto type of an indoor LED lamp application of Po=6 W and Vo=24 V is applied and the embodiment according to the present invention operates in the DCM-DCM state. An input current also has a discontinuous current form.

For a high power factor, a current form is required to be smooth. In this regard, an LC input filter is used.

Figure 10:
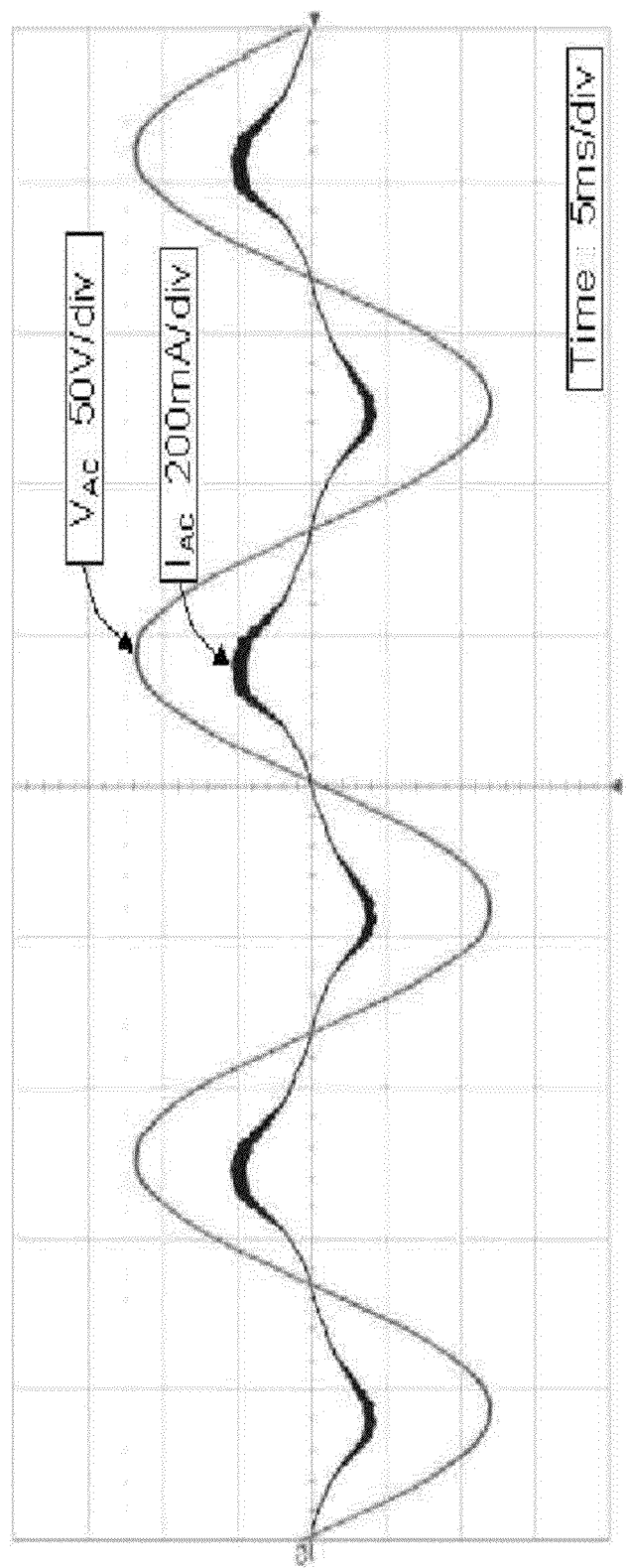
FIGS. 10 to 14 are waveform diagrams illustrating experimental results of an embodiment of according to the present invention.
Figure 11:
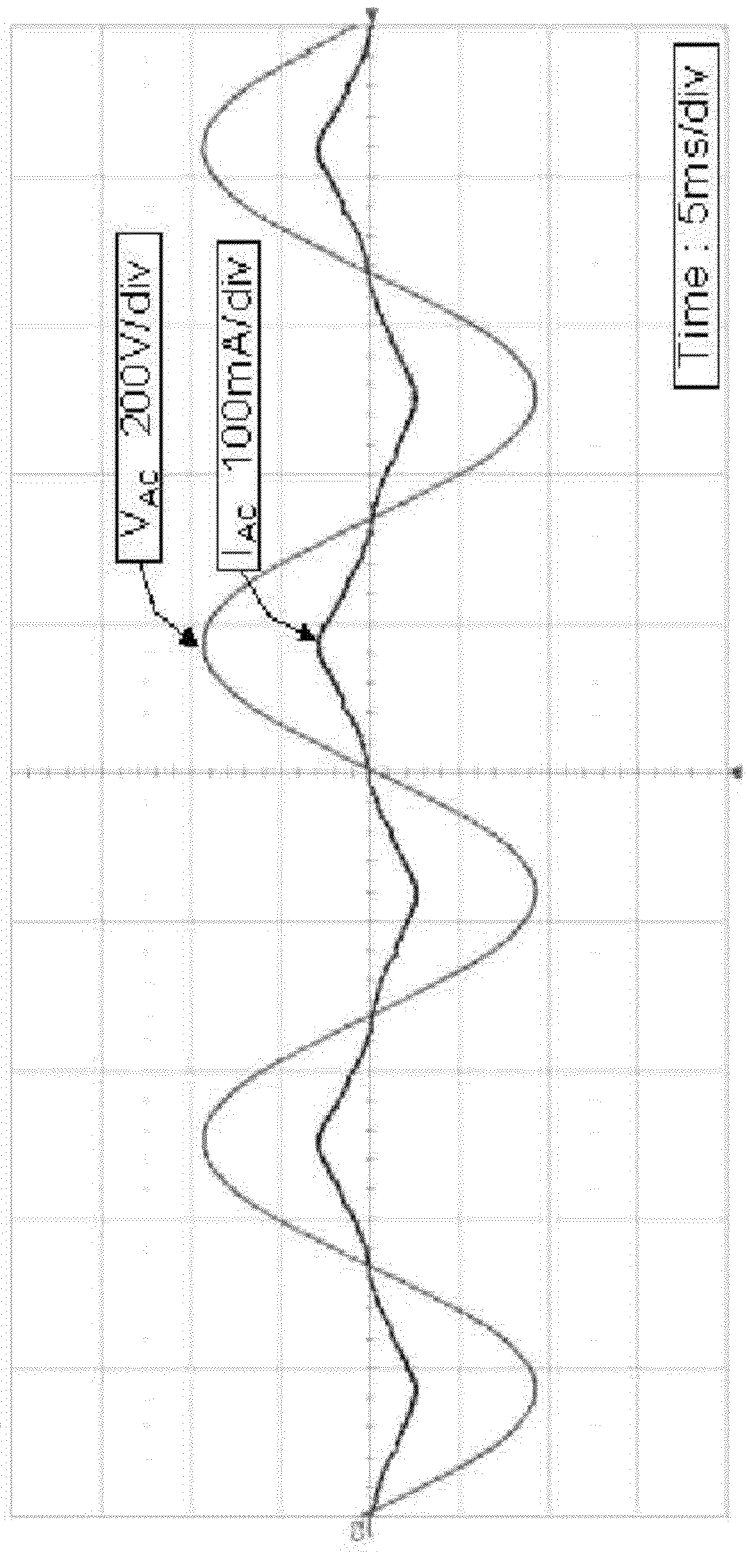

FIG. 10 and FIG. 11 illustrate measured waveforms of $V_{AC}$ and $I_{AC}$ in a full-load state at 85 Vrms and 265 Vrms AC input. The two waveforms have the same phase and $I_{AC}$ is adjusted as a sine wave. The measured PFs are 0.951 and 0.969 at the 85 Vrms and 265 Vrms AC input. In a general input voltage range, a PF exceeding 0.9 can be obtained using the power circuit configured in the embodiment according to the present invention.

Figure 12:
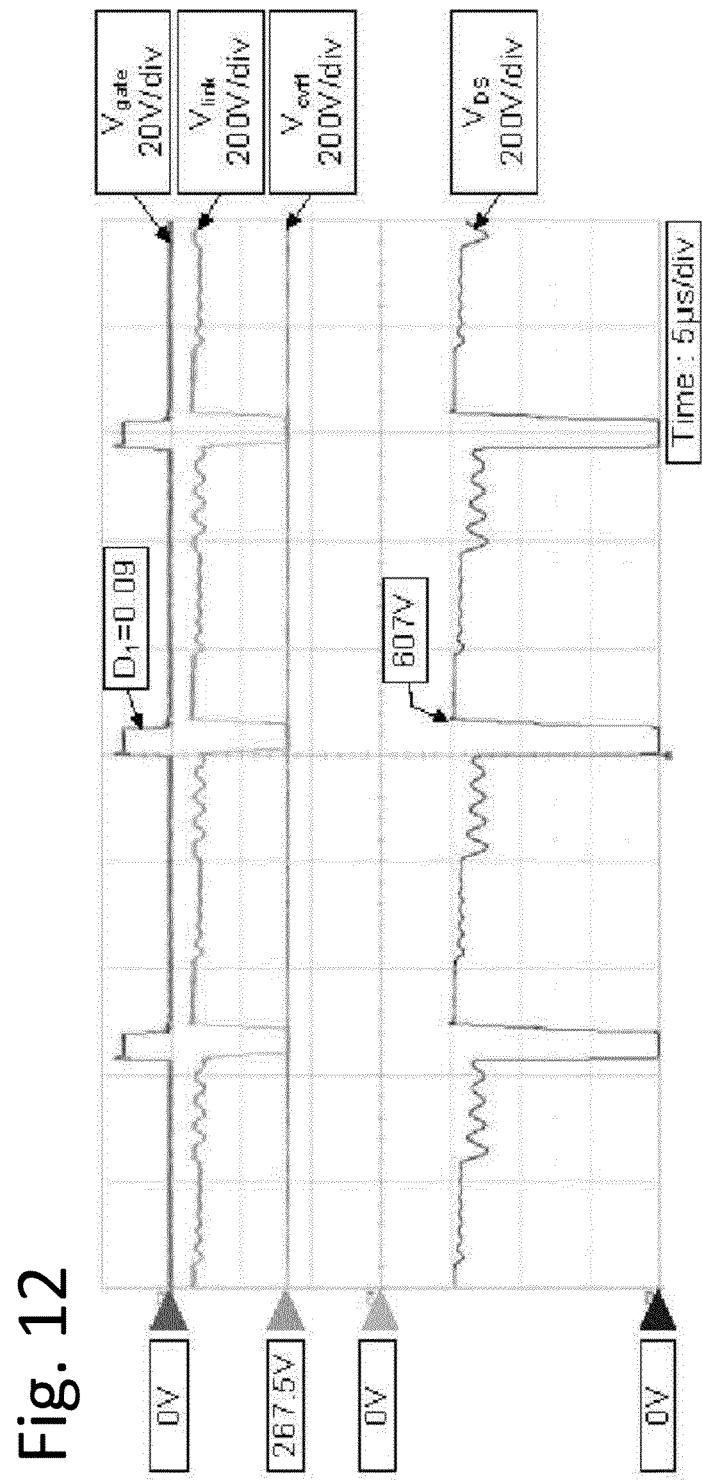

FIG. 12 illustrate a Vlink waveform at a 265 Vrms input voltage. Through the operation of the switch (M1), Vlink is changed to a value twice as large as Vcvf1. Accordingly, a duty ratio may increase. A peak value of VDs is 607 V due to voltage spikes by a leak inductor, and a flat region maintains 590 V or less. Accordingly, a switch having a rated voltage of 650 V may be employed to have a margin of 10.

Figure 13:
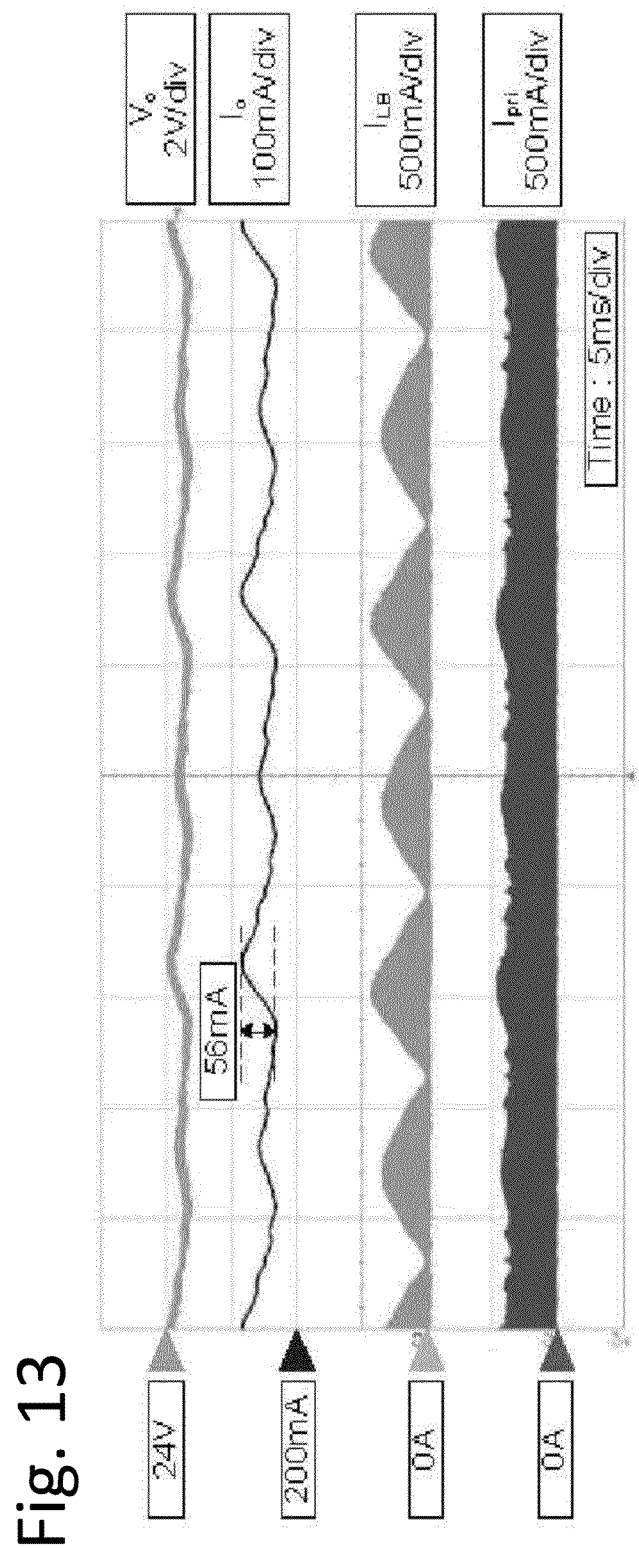
Figure 14:
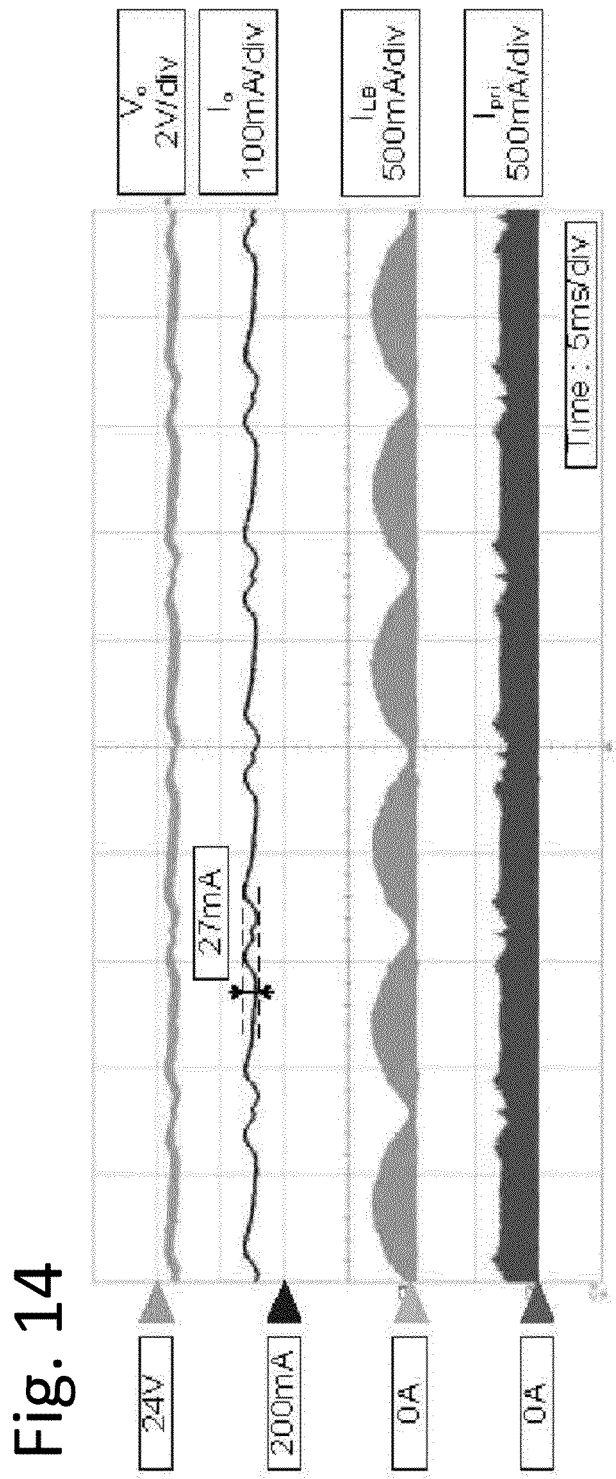

FIG. 13 and FIG. 14 illustrate experimental results of the boost inductor and the primary side current of the transformer at 85 Vrms and 265 Vrms. Through the waveforms, it is possible to confirm that two currents operate in the DCM state. The waveforms of the output voltage and the current are illustrated in the drawings. Current ripples occur with 56 mA (22.4) and 27 mA (10.8) in low and high lines. Typically, current ripples occurring in a power circuit of a single-stage structure are 50 or more. According to the results, it is possible to confirm that the embodiment according to the present invention can reduce current ripples without a separate additional control element.

While various embodiments have been described above, it will be understood to those skilled in the art that the embodiments described are by way of example only. Accordingly, the disclosure described herein should not be limited based on the described embodiments.

The invention claimed is:

1. A power circuit for driving an LED lamp, comprising:
a rectification circuit that outputs a rectified voltage;
a boost inductor that outputs a boost current corresponding to the rectified voltage;
a flyback transformer that outputs an output current corresponding to an input current of a primary side from a secondary side;
a switching circuit that is switched by a pulse type signal to control a of the input current of the primary side of the flyback transformer;
a valley fill circuit that provides the input current to the primary side of the flyback transformer by energy accumulated in the valley fill circuit when a boost switching circuit forms a path for increasing the boost current and accumulates the energy in the valley fill circuit by using the boost current when the boost switching circuit forms a path for accumulating the energy in the valley fill; and
the boost switching circuit that includes a first diode and a second diode connected with the boost inductor, provides the path for increasing the boost current through the second diode to the boost inductor in correspondence with turn-on of the switching circuit and provides the path for accumulating the energy in the valley fill circuit through the first diode, a first capacitor of the valley fill circuit, and a second capacitor of the valley fill circuit in correspondence with turn-off of the switching circuit,
wherein the first diode is turned off when the valley fill circuit accumulates the energy higher than a peak voltage of the rectified voltage.

2. The power circuit for driving an LED lamp according to claim 1, wherein the rectification circuit and the boost inductor operate in a first discontinuous conduction mode for first power factor correction, and the valley fill circuit operates in a second discontinuous conduction mode for second power factor correction for an input voltage applied to the primary side of the flyback transformer.

3. The power circuit for driving an LED lamp according to claim 1, wherein the valley fill circuit provides an output capacitor for the boost inductor and provides an input capacitor for the flyback transformer.

4. The power circuit for driving an LED lamp according to claim 1, wherein the valley fill circuit includes the first capacitor and the second capacitor for forming a link voltage, and the first capacitor and the second capacitor are equivalently connected in parallel with each other in order to provide the input current to the primary side of the flyback transformer or are equivalently connected in series with each other in order to accumulate the energy by using the boost current of the boost inductor, according to paths formed by the boost switching circuit.

5. The power circuit for driving an LED lamp according to claim 4, wherein the valley fill circuit provides the first capacitor and the second capacitor equivalently connected in parallel with each other when the boost switching circuit forms the path for increasing the boost current, and provides the first capacitor and the second capacitor equivalently connected in series with each other when the boost switching circuit forms a path for accumulating the energy.

6. The power circuit for driving an LED lamp according to claim 1, wherein the valley fill circuit includes the first capacitor and the second capacitor arranged in parallel with each other, a third diode connected from the second capacitor to the first capacitor in a forward direction, a fourth diode connected from the first capacitor to the primary side of the flyback transformer in a forward direction, and a fifth diode connected from a ground to the second capacitor in a forward direction.

7. The power circuit for driving an LED lamp according to claim 6, wherein the first capacitor and the second capacitor are equivalently connected in parallel with each other when the third diode is turned off, and are equivalently connected in series with each other through the third diode when the third diode is turned on, and turn-on and turn-off of the third diode are performed according to paths formed by the boost switching circuit.

8. The power circuit for driving an LED lamp according to claim 1, wherein the second diode provides the path for increasing the boost current in between the boost inductor and the switching circuit in correspondence with turn-on of the switching circuit, and the first diode provides the path for accumulating the energy in the valley fill circuit by using the boost current of the boost inductor in correspondence with turn-off of the switching circuit.

9. A power circuit comprising:
a boost power factor correction converter that performs first power factor correction for a rectified voltage in a first discontinuous conduction mode and includes a boost inductor that provides a boost current for forming a link voltage; and
a flyback DC-DC converter that performs second power factor correction for the link voltage formed by the boost current in a second discontinuous conduction mode,
wherein the flyback DC-DC converter comprises:
a flyback transformer that induces an input current of a primary side and outputs an output current from a secondary side;
a switching circuit that is switched by a pulse type signal to control a flow of the input current of the primary side of the flyback transformer;
a valley fill circuit that provides the input current to the flyback transformer by energy accumulated in the valley fill circuit when a boost switching circuit forms a path for increasing the boost current of the boost inductor and accumulates the energy in the valley fill circuit by using the boost current when the boost switching circuit forms a path for accumulating the energy in the valley fill circuit; and
the boost switching circuit that includes a first diode and a second diode connected with the boost inductor, provides the path for increasing the boost current through the second diode to the boost inductor in correspondence with turn-on of the switching circuit and provides the path for accumulating the energy in the valley fill circuit through the first diode, a first capacitor of the valley fill circuit, and a second capacitor of the valley fill circuit in correspondence with turn-off of the switching circuit,
wherein the first diode is turned off when the valley fill circuit accumulates the energy higher than a peak voltage of the rectified voltage.

10. The power circuit according to claim 9, wherein the valley fill circuit provides an output capacitor for the boost current and provides an input capacitor for the flyback transformer.

11. The power circuit according to claim 9, wherein the valley fill circuit includes the first capacitor and the second capacitor for forming the link voltage, and the first capacitor and the second capacitor are equivalently connected in parallel with each other in order to provide the input current in the primary side of the flyback transformer or are equivalently connected in series with each other in order to accumulate the energy by using the boost current, according to paths formed by the boost switching circuit.

12. The power circuit according to claim 11, wherein the valley fill circuit provides the first capacitor and the second capacitor equivalently connected in parallel with each other when the boost switching circuit forms the path for increasing the boost current and provides the first capacitor and the second capacitor equivalently connected in series with each other when the boost switching circuit forms the path for accumulating the energy.

13. The power circuit according to claim 9, wherein the valley fill circuit includes the first capacitor and the second capacitor arranged in parallel with each other, a third diode connected from the second capacitor to the first capacitor in a forward direction, a fourth diode connected from the first capacitor to the primary side of the flyback transformer in a forward direction, and a fifth diode connected from a ground to the second capacitor in a forward direction.

14. The power circuit according to claim 13, wherein the first capacitor and the second capacitor are equivalently connected in parallel with each other when the third diode is turned off, and are equivalently connected in series with each other through the third diode when the third diode is turned on, and turn-on and turn-off of the third diode are performed according to paths formed by the boost switching circuit.

15. The power circuit according to claim 9, wherein the second diode provides the path for increasing the boost current in between the boost power factor correction converter and the switching circuit in correspondence with turn-on of the switching circuit, and the first diode provides the path for accumulating the energy in the valley fill circuit by using, the boost current in correspondence with turn-off of the switching circuit.

16. A primary side control circuit of a flyback transformer that provides an input current to a primary side of the flyback transformer that performs DC-DC converting, comprising:
a boost power factor correction converter that includes a boost inductor that provides a boost current in correspondence with a rectified voltage;
a switching circuit that is switched by a pulse type signal to control a flow of the input current of the primary side of the flyback transformer;
a valley fill circuit that provides the input current to the flyback transformer by energy accumulated in the valley fill circuit when a boost switching circuit forms a path for increasing the boost current of the boost inductor and accumulates the energy in the valley fill circuit by using the boost current when the boost switching circuit forms a path for accumulating the energy in the valley fill circuit; and
the boost switching circuit that includes a first diode and a second diode connected with the boost inductor, provides the path for increasing the boost current through the second diode to the boost inductor in correspondence with turn-on of the switching circuit and provides the path for accumulating the energy in the valley fill circuit through the first diode, a first capacitor of the valley fill circuit, and a second capacitor of the valley fill circuit in correspondence with turn-off of the switching circuit,
wherein the first diode is turned off when the valley fill circuit accumulates the energy higher than a peak voltage of the rectified voltage.

17. The primary side control circuit of a flyback transformer according to claim 16, wherein the first capacitor and the second capacitor are equivalently connected in parallel with each other in order to provide the input current to the primary side of the flyback transformer or are equivalently connected in series with each other in order to accumulate the energy by using the boost current, according to paths formed by the boost switching circuit.

18. The primary side control circuit of a flyback transformer according to claim 16, wherein the valley fill circuit includes the first capacitor and the second capacitor arranged in parallel with each other, a third diode connected from the second capacitor to the first capacitor in a forward direction, a fourth diode connected from the first capacitor to the primary side of the flyback transformer in a forward direction, and a fifth diode connected from a ground to the second capacitor in a forward direction.

19. The power circuit for driving an LED lamp according to claim 16, wherein the boost switching circuit comprises:
the second diode that provides the path for increasing the boost current in between the boost power factor correction converter and the switching circuit in correspondence with turn-on of the switching circuit, and the first diode that provides the path for accumulating the energy in the valley fill circuit by using the boost current in correspondence with turn-off of the switching circuit.

20. A power supply method for driving an LED lamp, comprising:
- a step in which a boost power factor correction converter that includes a boost inductor that provides a boost current obtained by performing first power factor correction for a rectified voltage in a first discontinuous conduction mode;
- a step in which a switching circuit connected to a primary side of a flyback transformer is turned on;
- a step in which a boost switching circuit including a first diode and a second diode connected with the boost inductor that forms a path for increasing the boost current of the boost inductor through the second diode in correspondence with turn-on of the switching circuit;
- a step in which a first capacitor and a second capacitor in a valley fill circuit are equivalently connected in parallel with each other when the boost switching circuit forms the path for increasing the boost current through the second diode and the input current is provided to the primary side of the flyback transformer by using energy accumulated in the first capacitor and the second capacitor;
- a step in which the switching circuit is turned off;
- a step in which the boost switching circuit forms a path for accumulating the energy in the valley fill circuit through the first diode, the first capacitor, and the second capacitor in correspondence with turn-off of the switching circuit; and
- a step in which the first capacitor and the second capacitor in the valley fill circuit are equivalently connected in series with each other when the path for accumulating the energy is formed through the first diode, the first capacitor, and the second capacitor, and the energy is accumulated in the first capacitor and the second capacitor by the boost current,
wherein the first diode of the boost switching circuit is turned off when the valley fill circuit accumulates the energy higher than a peak voltage of the rectified voltage.

* * * * *